United States Patent [19]

Belanger et al.

[11] 3,818,061

[45] June 18, 1974

[54] TRANSPARENT NMR SHIFT REAGENTS

[75] Inventors: Patrice Belanger, Dollard des Ormeaux, Quebec; Michael O. Luke, Pointe Claire, Quebec, both of Canada

[73] Assignee: Merck Sharp & Dohme (I.A.), New York, N.Y.

[22] Filed: Nov. 9, 1971

[21] Appl. No.: 197,122

[52] U.S. Cl. .......................................... 260/429.2
[51] Int. Cl. ............................................ C07f 5/00
[58] Field of Search ................................ 260/429.2

[56] References Cited
UNITED STATES PATENTS

| | | | |
|---|---|---|---|
| 3,453,319 | 7/1969 | Eisentraut et al. | 260/429.2 |
| 3,539,941 | 11/1970 | Halverson | 260/429.2 X |
| 3,704,100 | 10/1972 | Sievers | 260/429.2 X |

OTHER PUBLICATIONS

Johnson et al., "Deuteron Nuclear Magnetic Resonance Spectra of Some Paramagnetic Transition Metal Acetylacetonates." J. A. Chem. Soc., 92,22, Nov. 4, 1970, pg. 6705. [QD1/A5]

Chen et al., "CoIII and VIII Complexes of 3-Substituted Camphor," J. Am. Chem. Soc., 90,24, Nov. 20, 1968 p. 6660. [QD1/A5]

Whitesides et al., "Tris[3-(tertbutylhydroxymethylene)-d-camphorato] Europium III," J. Am. Chem. Soc., 92,23, Nov. 18, 1970 pg. 6979. [QD1/A5]

Sanders et al., "A Shift Reagent for Use in NMR Spectroscopy" Journal of Chem. Soc., Sec. D, No. 7, Apr. 8, 1970 p. 422. [QD1/C6ad]

Primary Examiner—Leland A. Sebastian
Attorney, Agent, or Firm—Erma R. Coutts

[57] ABSTRACT

Rare earth metal chelates of $\beta$-diketones that are deuterated or deuterated plus halogenated and contain no more than 5 hydrogen atoms in the diketone moiety are described. The novel chelates are useful NMR shift reagents particularly because they not only solubilize the rare earth metal but additionally the $\beta$-diketone ligand is substantially to completely transparent to proton NMR analysis. The chelates are prepared by reacting the rare earth metal nitrate with the $\beta$-diketones by conventional methods.

10 Claims, No Drawings

TRANSPARENT NMR SHIFT REAGENTS

This invention is concerned with improved shift reagents for NMR (nuclear magnetic resonance) analysis. In particular, this invention is concerned with novel shift reagents that are transparent to proton NMR analysis.

While it recently has become known that rare earth metals are uniquely effective shift reagents, and in particular europium and praseodymium, it has been necessary to discover a means for solubilizing these metals in the usual organic solvents employed in NMR analyses and at the same time do not introduce a substance which would itself produce NMR signals and thus interfere with those of the substrate under examination. While the prior art prepared complexes of the rare earth metals that are soluble in organic solvents, in substantially all cases care must be exercised in their use to avoid confusing the shift reagent signals with those of the substrate. Additionally, detail in the NMR spectra is lost when signals due to substrate and shift reagent protons coincide. In some cases, this loss of detail is sufficiently serious to disallow the use of the shift reagent in NMR analysis. This disadvantage of the prior art shift reagents discourage their routine use in NMR analysis.

It is accordingly the object of this invention to provide NMR shift reagents transparent to proton NMR analysis, that is, giving very small or non-existent signals in the NMR spectra while preserving good solubility and shifting ability. The novel transparent shift reagents of this invention represent a marked improvement over the prior art analogs particularly because they are transparent to $^1$HNMR. An advantage of having a transparent shift reagent resides in the fact that there is no need to identify peaks due to the shift reagent; spectral interpretation therefore is simplified, can be done more quickly and is less prone to error. The transparent shift reagents of this invention thus avoid all interference problems which arise using known shift reagents.

The novel NMR shift reagents of this invention are rare earth metal chelates of $\beta$-diketones that are transparent to proton NMR or which give only relatively small peaks compared to the smallest peak due to the substrate under NMR examination. The $\beta$-diketones suitable as chelating agents are those in which the hydrogen atoms have been replaced by deuterium or by deuterium and halogen atoms, especially fluorine, bromine or chlorine atoms.

In shift reagents transparent to NMR proton analysis the level of deuteration or deuteration plus halogenation required for NMR transparency depends to some extent on the use to which the reagent is to be employed. Material having no more than two hydrogen atoms in the diketone moiety would normally be desirable since the NMR signal produced by material of that high level proton substitution would be very small. However, material of lower isotopic purity often may be suitable with certain substrates to be analyzed and this circumstance would be readily recognized by one skilled in this art. The minimum acceptable level of residual protons is considered to be about five, and where deuteration or deuteration plus halogenation is referred to in this application and the appended claims this shall mean that there are no more than five hydrogen atoms in the diketone moiety.

A shift reagent comprises two parts, one active part and one inactive part. The active part of the shift reagent of this invention is a rare earth metal of the lanthanide series of elements selected from praseodymium (Pr), samarium (Sm), europium (Eu), terbium (Tb), holmium (Ho), and ytterbium (Yb). The rare earth metals of particular importance in relation to the present invention are europium and praseodymium as complexes prepared with these metals generally make it possible to shift resonances of affected protons to high or low field depending on which side of the spectrum is least cluttered by resonances of unaffected protons. Europium (Eu) and praseodymium (Pr) normally produce shift in opposite directions; Eu normally produces shift downfield while Pr normally produces shifts upfield. Additionally, these two preferred metals have been found to possess superior ability to form complexes with most substrates to be analyzed.

The inactive part of the shift reagent is an organic molecule whose essential function is to render the rare earth metal soluble in solvents conventionally employed in NMR analyses thus enabling the rare earth metal to complex with the compound under study. The organic molecule forming the inactive part of the shift reagent is a $\beta$-diketone having the structure

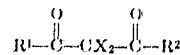

wherein X generally is hydrogen or deuterium, $R^1$ is aliphatic and $R^2$ is selected from aliphatic or mononuclear heterocyclic groups. When aliphatic the substituents can be linear ($C_{1-10}$) or polycyclic ($C_{6-10}$); when heterocyclic they preferably are monocyclic having $C_{5-6}$ atoms and preferably can contain sulfur or oxygen as the hetero atom, advantageously the thienyl or furyl group. In addition, X AND $R^2$ in the moiety

can be linked to form, with the carbon atoms to which they are attached, the 3-camphoryl-$d_{15}$ radical. Either or both of $R^1$ and $R^2$ is sufficiently deuterated so as to render the $\beta$-diketone essentially transparent to proton NMR analysis. When only one of $R^1$ and $R^2$ is deuterium substituted the other group generally is sufficiently halogenated with chlorine, bromine or preferably fluorine so as to render the resulting $\beta$-diketone essentially transparent to proton NMR analysis. In either instance, substitution with deuterium or with deuterium plus hydrogen and/or halogen must be to such an extent that the total number of residual hydrogen atoms does not exceed five.

The rare earth metals, particularly europium and praseodymium, are used in their trivalent (III) form. Because of the trivalent state of the metal ion, one atom of metal chelates or complexes with three molecules of the $\beta$-diketone. The following structure is illustrative of the transparent shift reagents of this invention

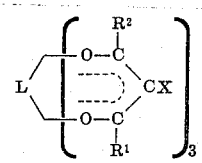

wherein L represents a lanthanide element selected from Pr, Sm, Eu, Tb, Ho, and Yb and each of the variables $R^1$, $R^2$ and X have the meaning assigned above.

Complexing or chelating of the insoluble rare earth metal with the β-diketones converts them to a readily soluble form in the organic solvents normally employed in NMR analysis. Once in solution the rare earth metal ions can complex or chelate with many types of organic compounds and in so doing produce changes in their NMR spectra. Comparing the spectra before and after complexing makes possible many deductions concerning the structure of the compound being analyzed. The shift reagents of this invention are effective for use in the NMR analysis of, inter alia, alcohols, ketones, esters, ethers, amines, steroids, peptides and natural products such as sugars.

As examples of preferred transparent shift reagents of this invention are the europium (Eu) and praseodymium (Pr) tris complexes with the above defined β-diketone ligands, and especially those wherein $R^1$ is t-butyl-$d_9$.

The transparent-to-proton NMR shift reagents of this invention are prepared by conventional methods except that β-diketones of the type hereinbefore defined are employed in place of the protonated or partially fluorinated or halogenated (Cl or Br) β-diketones of the prior art, i.e., β-diketones having an excess of five hydrogen atoms in the molecule. In general the procedure employed comprises adding an aqueous solution of the desired rare earth metal nitrate to the β-diketone ligand in the presence of an alkali metal lower alkoxide which can be formed in situ by adding an admixture of an alkali metal hydroxide, preferably sodium or potassium hydroxide, in the selected alkanol under nitrogen. The solution is stirred until precipitation of the complex begins which normally occurs in about 2 hours. The alkanol then is removed under vacuum, water added and stirring continued overnight. The suspension is filtered, the filter cake dried under vacuum, powdered, recrystallized from hot carbon tetrachloride and vacuum dried.

The following procedures and examples illustrate methods for the preparation of starting materials as well as the novel shift reagents of this invention. The methods employed are standard, well documented procedures, modified slightly to allow for the preparation of deuterated or deuterated and halogenated analogs of compounds described in the literature. The chlorinated and brominated compounds can be prepared by essentially the same method illustrated for the preparation of fluorinated β-diketones. It will be understood, of course, that other methods known to produce rare earth metal chelates of β-diketones can be employed to prepare the novel shift reagents of this invention as well as modifications of these known methods that would be obvious to those skilled in the art.

PROCEDURE 1

Preparation of $L(NO_3)_3 \cdot XH_2O$ where L is a lanthanide (e.g. Eu, Pr, Sm, Tb, Ho, Yb)

The selected lanthanide oxide, (5 g.) is added to 10 ml. distilled water in a 50 ml. round-bottomed flask with magnetic stirrer and water-cooled condensor. Concentrated nitric acid (9 g., 69–71 percent $NHO_3$) then is added, the mixture stirred one hour and filtered. The filtrate is titrated to pH 4.6 with 8N alkali metal hydroxide, such as sodium hydroxide or potassium hydroxide solution, filtered free of the small amount of precipitate formed and the filtrate concentrated on a flash evaporator to give the desired lanthanide nitrate.

PROCEDURE 2

Synthesis of intermediate ketones, acid halides and esters (2a) Synthesis of Pinacolone-$d_9$ A small portion of a solution of 50 g. mercuric chloride in 200 g. acetone-$d_6$ (hereinafter referred to as solution A) is added to 40 g. magnesium turnings and 500 ml. benzene in a 2-liter, three-necked flask. The flask contents are heated to reflux, the heat reduced and the remainder of solution A added at a rate sufficient to maintain reflux. After all of solution A is added, additional acetone-$d_6$ (100 g.) is added dropwise to maintain reflux and the reaction mixture then refluxed for an additional 2 hours. The mass of magnesium pinacolinate-$d_{12}$ in the flask is shaken vigorously for several minutes and refluxing then continued for an additional two hours. Water (100 ml.) is added, the reaction mixture refluxed for an additional 1 hour, then cooled to 50° C. and filtered. Benzene (250 ml.) is added to the solid residue and the mixture refluxed one-half hour, cooled again and filtered. The filtrates are combined and concentrated to one-half their volume, water (120 ml.) added, the two-phase mixture cooled in ice water and filtered to yield solid pinacol-$d_9$ hydrate (180 g.). A 40 g. portion of this product is added to 6N sulfuric acid (120 ml.) and rapidly distilled. The water layer of the distillate is returned to the distillation flask along with concentrated sulfuric acid (11 ml.) and additional pinacol-$d_9$ hydrate (40 g.) added. The procedure is repeated until 200 g. of pinacol-$d_9$ hydrate is used. The combined distillates then are dried and distilled yielding pinacolone-$d_9$ (57 g.), b.p. 97°–100° C. at 760 mm. pressure.

For the preparation of pinacolone-$d_{12}$, b.p. 97°–100° C. at 760 mm. pressure, the above procedure is repeated using an equivalent concentration of $D_2SO_4$ in $D_2O$ in place of the 6N sulfuric acid.

By replacing the mercuric chloride and magnesium turnings employed in the preceding procedure by aluminum amalgam the yield of pinacolone-$d_9$ and pinacolone-$d_{12}$ is improved.

Pinacolone-$d_9$ is a preferred intermediate in the synthesis of β-diketones used in the ultimate synthesis of the transparent NMR reagents of this invention. It can be reacted with a wide variety of acid chlorides or esters to provide β-diketones wherein $R^1$ is the tertiary-butyl-$d_9$ group. Alternatively, pivalyl chloride-$d_9$ or its phenyl or lower alkyl ester can be reacted with an appropriate ketone to yield β-diketones wherein $R^1$ is the t-butyl-$d_9$ group. The particular choice for using the ketone, acid chloride or ester in preparing the β-diketone is determined by the availability of reagents which will yield the $R^2$ group.

The preparation of typical acid chlorides and esters according to known procedures is illustrated by the following preparation.

(2b) Preparation of pivalic acid-$d_9$, pivalyl chloride-$d_9$ and the phenyl and alkyl esters of pivalic acid-$d_9$ Bromine (144 g.) is added dropwise with stirring at a rate sufficient to keep the reaction mixture between 5-10° C. to an ice-bath cooled 2-liter 3-necked flask containing a solution of sodium hydroxide (100 g.) in water (750 ml.). After the addition is completed, the flask is cooled to 0° C. and pinacolone-$d_9$ (30 g.) is added dropwise while maintaining the reaction mixture between 0° and 10° C. The reaction mixture is stirred for 5 hours at 0°-5° C. and then overnight at ambient temperature. The reaction mixture is distilled to remove by-products, concentrated sulfuric acid (120 ml.) is added cautiously with stirring, and the reaction mixture then distilled until material heavier than water comes over. The crude distillate is ether extracted and the ether then removed by flash evaporation to give pivalic acid-$d_9$, b.p. 70° C. at 15 mm. pressure.

The pivalic acid-$d_9$ thus obtained is converted to the acid chloride by quickly distilling the product formed upon the addition of benzoyl chloride (55 g.). There is thus obtained pivalyl chloride-$d_9$, 25 g., b.p. 105° C. at 760 mm. pressure.

The phenyl ester of pivalic acid-$d_9$ is prepared by the dropwise addition over a period of about one hour of pivalyl chloride-$d_9$ (22.8 g.) to a refluxing mixture of magnesium turnings (0.15 mole), phenol (16 g.) and benzene (32 ml.). The reaction mixture is refluxed for three hours to provide the phenyl ester of pivalic acid-$d_9$, b.p. 100° C. at 10 mm.

Pivalyl chloride-$d_9$ is converted to the ethyl or other lower alkyl ester of pivalic acid-$d_9$ by employing ethanol or other lower alkanol in place of phenol in the preceding procedure.

Other ketones, acid chlorides or esters thereof such as the phenyl and lower alkyl esters having from 1 to 10 carbons and preferably one to five carbons in the alkyl chain can be prepared by the procedures described above or by other known methods and each of them can be substituted for pinacolone-$d_9$ or -$d_{12}$ in the preparation of the β-diketones. Some examples of additional suitable intermediates are 2-acetylthiophene, 2-acetylfuran, heptafluorobutyryl chloride, methyl adamantyl-$d_{15}$ ketone and ethyl ester of adamantane-$d_{15}$ carboxylic acid.

PROCEDURE 3

Preparation of β-diketones (3a) Preparation of 1,1,1,2,2,3,3-heptafluoro-7,7-di(methyl-$d_3$-8,8,8trideuterooctane-4,6-dione Pinacolone-$d_9$ (20 g.) in ether (25 ml.) is added to a cooled suspension of sodamide (6.69 g.) or sodium hydride (4.8 g.) in ether (150 ml.). When addition is completed, ethyl heptafluorobutanoate (23.2 g.) is added over one-half hour and the reaction mixture then is refluxed for two and one-half to three hours to provide a 70 percent yield of product.

(3b) Preparation of 1-bromo-5,5-di(methyl-$d_3$)-3,3,6,6,6-pentadeuterohexane-2,4-dione By replacing pinacolone-$d_9$ and ethyl heptafluorobutanoate employed in procedure 3a by equivalent quantities of pinacolone-$d_{12}$ and bromoacetyl bromide, respectively, and following substantially the same method, there is obtained the above-identified diketone.

(3c) Preparation of 1-chloro-6,6-di(methyl-$d_3$)-4,4,7,7,7,-pentadeuteroheptane-3,5-dione By replacing pinacolone-$d_9$ and ethyl heptafluorobutanoate employed in procedure 3a by equivalent quantities of pinacolone-$d_{12}$ and 3-chloropropionyl chloride, respectively, and following substantially the same method, there is obtained the above-identified diketone.

(3d) Preparation of 1,1-dichloro-5,5-di(methyl-$d_3$)-3,3,6,6,6-pentadeuterohexane-2,4-dione By replacing pinacolone-$d_9$ and ethyl heptafluorobutanoate employed in procedure 3a by equivalent quantities of pinacolone-$d_{12}$ and dichloroacetyl chloride, respectively, and following substantially the same method, there is obtained the above-identified diketone.

(3e) Preparation of 1,2-dibromo-6,6-di(methyl-$d_3$)-4,4,7,7,7-pentadeuteroheptane-3,5-dione By replacing pinacolone-$d_9$ and ethyl heptafluorobutanoate employed in procedure 3a by equivalent quantities of pinacolone-$d_{12}$ and ethyl 2,3-dibromopropionate, respectively, and following substantially the same method, there is obtained the above-identified diketone.

(3f) Preparation of 1,1,1,2,2-pentafluoro-6,6-di(methyl-$d_3$)-4,4,7,7,7-pentadeuteroheptane3,5-dione By replacing pinacolone-$d_9$ and ethyl heptafluorobutanoate employed in procedure 3a by equivalent quantities of pinacolone-$d_{12}$ and ethyl pentafluoropropionate, respectively, and following substantially the same method, there is obtained the above-identified diketone.

(3g) Preparation of 1-chloro-5,5-di(methyl-$d_3$)-3,3,6,6,6-pentadeuterohexane-2,4-dione By replacing pinacolone-$d_9$ and ethyl heptafluorobutanoate employed in procedure 3a by equivalent quantities of pinacolone-$d_{12}$ and chloroacetyl chloride, respectively, and following substantially the same method, there is obtained the above-identified diketone.

(3h) Preparation of 1,1,1-trideutero-2,2-di(methyl-$d_3$)-5-(2-thienyl)pentane-3,5-dione By replacing the pinacolone-$d_9$ and the ethyl heptafluorobutanoate employed in procedure 3a by equivalent quantities of pivalyl chloride-$d_9$ and 2-acetylthiophene, there is obtained 1,1,1-trideutero-2,2-di(methyl-$d_3$)-5-(2-thienyl)-pentane-3,5-dione, b.p. 45°-50° C. at 10 mm. pressure. The same product is prepared when instead of the pivalyl chloride-$d_9$ there is substituted phenyl pivalate-$d_9$ or ethyl pivalate-$d_9$.

(3i) Preparation of 1,1,1-trideutero-2,2-di(methyl-$d_3$)-5-(2-furyl)-pentane-3,5-dione By replacing pinacolone-$d_9$ and ethyl heptafluorobutanoate employed in procedure 3a by equivalent quantities of pivalyl chloride-$d_9$ and 2-acetylfuran, respectively, and following substantially the same method, there is obtained the above-identified diketone.

(3j) Preparation of 1,1,1,7,7,7-hexadeutero-2,2,6,6-tetra-(methyl-$d_3$)-heptane-3,5-dione Pinacolone-$d_9$ (22.4 g.) in ether (25 ml.) is added dropwise with stirring to a suspension of sodamide (7.8 g.) or sodium hydride (5.6 g.) in 150 ml. of ether. After 10 minutes, 18.7 g. of the phenyl ester of pivalic acid-$d_9$ is added dropwise over one-half hour. After a further one-half hour of stirring the reaction mixture is heated to reflux for two and one-half hours, stirred for a further one hour without heat, then poured onto 70 g. ice and 20 ml. concentrated hydrochloric acid. The resulting slurry is ether extracted, the ether layers combined, the ether removed by flash evaporation and the residue vacuum distilled to give 17 g. of 1,1,1,7,7,7-hexadeutero-2,2,6,6-tetra(methyl-$d_3$)-heptane-3,5-dione, b.p. 80°–81° C. at 20 mm.

(3k) Preparation of 1,1,1,4,4,7,7,7-octadeutero-2,2,6,6-tetra(methyl-$d_3$)-heptane-3,5-dione The above product (b.p. 80°–81° C. at 20 mm.) is prepared by repeating the process of preparation 3j employing an equivalent quantity of pinacolone-$d_{12}$ in place of pinacolone-$d_9$.

(3-l) Preparation of 3-(tert-butylcarbonyl)-camphor-$d_{24}$

Camphor-$d_{16}$ (100 g.) in 500 ml. 1,2-dimethoxyethane is added at a controlled rate with stirring to sodamide (23.4 g.) or sodium hydride (16.8 g.) in 100 ml. 1,2-dimethoxyethane and the reaction mixture heated to 85° C. until evolution of ammonia stops. The reaction pot is swept out with nitrogen for one-half hour to ensure removal of all ammonia by-product. A solution of pivalyl chloride-$d_9$ (28 g.) in an equal volume of 1,2-dimethoxyethane is added over one-half hour, the reaction mixture then is stirred at 85° C. for 18 hours, cooled, poured onto a mixture of 200 g. of ice and 60 ml. concentrated hydrochloric acid and the resultant slurry extracted with ether. The ether layers are combined, ether removed by flash evaporation and the excess camphor-$d_{16}$ in the residual yellow slushy solid removed by sublimation under vacuum at 70° C. The yellow liquid remaining is vacuum distilled to give 19 g. of pale yellow liquid product, b.p. 90° C. at 1 mm. The recovered excess camphor-$d_{16}$ (70 g.) can be recycled.

(3m) Preparation of 3-(heptafluoropropylcarbonyl)-camphor-$d_{15}$

Using heptafluorobutyryl chloride (52 g.) in place of pivalyl chloride-$d_9$ in the synthesis described in procedure 3-l there is obtained 3-(heptafluoropropylcarbonyl)-camphor-$d_{15}$.

(3n) Preparation of 1,1,1-trideutero-2,2-di(methyl-$d_3$)-5-(1-adamantyl-$d_{15}$)-pentane-3,5-dione Using the ethyl ester of adamantane-$d_{15}$ carboxylic acid in place of the phenyl ester of pivalic acid-$d_9$ employed in procedure 3j and following the procedure of procedure 3j, there is obtained the 1,1,1-trideutero-2,2-di(methyl-$d_3$)-5-(1-adamantyl-$d_{15}$)-pentane-3,5-dione.

(3o) Preparation of 1,1,1,2,2,3,3-heptafluoro-6-(1-adamantyl-$d_{15}$)-hexane-4,6-dione By following the synthesis of procedure 3a but substituting methyl adamantyl-$d_{15}$ ketone (34.4 g.) for pinacolone-$d_9$ there is prepared 1,1,1,2,2,3,3-heptafluoro-6-(1-adamantyl-$d_{15}$)-hexane-4,6-dione.

The methyl adamantyl-$d_{15}$ ketone can be prepared by converting adamantane-$d_{15}$ carboxylic acid (15 g.) to the acid chloride by refluxing 30 minutes with 30 ml. thionyl chloride followed by removal of excess thionyl chloride by distillation. The acid chloride so formed in 45 ml. benzene is added to an equivalent amount of

prepared by the reaction of magnesium with ethyl malonate in a benzene-alcohol solution with stirring and cooling over one-half hour. The reaction mixture is refluxed for one hour, cooled, treated with ice and dilute sulfuric acid, the benzene layer dried and benzene removed by flash evaporation to yield 16 g. of ethyl 3-(1-adamantyl-$d_{15}$)-3-oxo-propionate. This product is refluxed with 32 ml. glacial acetic acid, 19 ml. water and 3.5 ml. concentrated sulfuric acid for four hours, then cooled and poured onto 190 ml. of ice-water. The precipitate is collected and vacuum dried to yield 11 g. methyl adamantyl-$d_{15}$ ketone, m.p. 53°–54° C.

(3p) Preparation of 1,3-di(1-adamantyl-$d_{15}$)-propane-1,3-dione

By replacing the pinacolone-$d_9$ and ethyl heptafluorobutyrate employed in preparation 3a by equivalent quantities of methyl adamantyl-$d_{15}$ ketone and ethyl ester of adamantane-$d_{15}$ carboxylic acid, respectively, and following substantially the same method described therein, the above product is obtained.

Preparation of the transparent shift reagents

The shift reagents are prepared by reacting a selected lanthanide rare earth metal, and in particular europium or praseodymium, but also Sm, Tb, Ho or Yb, in the form of its nitrate with a β-diketone in a slightly basic mixture of ethanol-water. The reaction is well known in the prior literature and the following examples are typical for such a preparation.

EXAMPLE 1

Europium nitrate (4.8 g.) in 95 percent ethanol (50 ml.) is placed in a 500 ml. 3-necked, round-bottomed flask fitted with magnetic stirrer, inlet for nitrogen, outlet for vacuum, and heating mantle. Additional 95 percent ethanol (50 ml.) is added, followed by the addition of 1,1,1-trideutero-2,2-di-(methyl-$d_3$)-6,6,7,7,8,8,8-heptafluorooctane-3,5-dione (26 g.) and sodium hydroxide (4 g.) in 50 percent ethanol-water (100 ml.). The flask is closed and evacuated and stirring of the mixture begun and continued for about 2 hours. The volume of the solution is reduced using a heating mantle and vacuum. Distilled water (350 ml.) then is added, the flask closed and the reaction mixture stirred overnight. The precipitate then is collected by filtration, washed with distilled water and dried under vacuum yielding solid tris[1,1,1-trideutero-2,2-di(methyl-$d_3$)-6,6,7,7,8,8,8-heptafluorooctane-3,5-dionato]-europium, m.p. 200°–210° C.

EXAMPLE 2

By replacing the europium nitrate employed in Example 1 by an equivalent quantity of praseodymium nitrate and following substantially the same procedure described above there is obtained tris[1,1,1-trideutero-2,2-di(methyl-$d_3$)-6,6,7,7,8,8,8-heptafluorooctane-3,5-dionato]praseodymium, m.p. 215°–223° C.

EXAMPLE 3

By replacing the diketone employed in Example 1 by an equivalent quantity of 1,1,1,7,7,7-hexadeutero-2,2,6,6-tetra(methyl-$d_3$)-heptane-3,5-dione and reacting it with europium nitrate by the procedure described above there is obtained tris[1,1,1,7,7,7-hexadeutero-2,2,6,6-tetra(methyl-$d_3$)-heptane-3,5-dionato]europium, m.p. 185°–188° C.

EXAMPLE 4

Similarly by reacting praseodymium nitrate with 1,1,-1,7,7,7-hexadeutero-2,2,6,6-tetra(methyl-$d_3$)-heptane-3,5-dione by the procedure described in Example 1 there is obtained tris[1,1,1,7,7,7-hexadeutero-2,2,6,6-tetra(methyl-$d_3$)-heptane-3,5-dionato]praseodymium, m.p. 220°–224° C.

EXAMPLE 5

Also prepared by the method of Example 1 are the europium chelate and praseodymium chelate of the diketone 1,1,1,4,4,7,7,7-octadeutero-2,2,6,6-tetra(methyl-$d_3$)-heptane-3,5-dione. The europium complex has m.p. 185°–188° C.; the praseodymium chelate has m.p. 220°–224° C.

EXAMPLE 6

By replacing the diketone employed in Example 1 by an equivalent quantity of 1,1,1-trideutero-2,2-di(methyl-$d_3$)-5-(2-thienyl)-pentane-3,5-dione there is obtained tris[1,1,1-trideutero-2,2-di(methyl-$d_3$)-5-(2-thienyl)-pentane-3,5-dionato]europium.

The praseodymium chelate of this diketone also is prepared by the same procedure except praseodymium nitrate is reacted with the diketone according to the process described above.

EXAMPLE 7

By replacing the europium nitrate employed in Example 1 by an equivalent quantity of terbium nitrate and following the procedure of Example 1 there is prepared tris[1,1,1-trideutero-2,2-di(methyl-$d_3$)-6,6,7,7,8,8,8-heptafluorooctane-3,5-dionato]terbium, m.p. 190°–195° C.

EXAMPLE 8

Replacement of europium nitrate and the diketone employed in Example 1 by an equivalent amount of terbium nitrate and 1,1,1,7,7,7-hexadeutero-2,2,6,6-tetra(methyl-$d_3$)-heptane-3,5-dione, respectively, and following the procedure of Example 1 there is obtained tris[1,1,1,7,7,7-hexa-deutero-2,2,6,6-tetra(methyl-$d_3$)-heptane-3,5-dionato]terbium, m.p. 175°–179° C.

EXAMPLE 9

Similarly, substitution of terbium nitrate for the europium and praseodymium nitrates in Example 5 yields tris[1,1,1,4,4,7,7,7-octadeutero-2,2,6,6-tetra(methyl-$d_3$)-heptane-3,5-dionato]terbium, m.p. 175°–179° C.

EXAMPLE 10

By replacing the europium nitrate employed in Example 1 by an equivalent quantity of holmium nitrate and following the procedure of Example 1 there is prepared tris[1,1,1-trideutero-2,2-di(methyl-$d_3$)-6,6,7,7,8,8,8-heptafluorooctane-3,5-dionato]holmium, m.p. 173°–177° C.

EXAMPLE 11

Replacement of europium nitrate and the diketone employed in Example 1 by an equivalent amount of holmium nitrate and 1,1,1,7,7,7-hexadeutero-2,2,6,6-tetra(methyl-$d_3$)-heptane-3,5-dione, respectively, and following the procedure of Example 1 there is obtained tris[1,1,1,7,7,7-hexadeutero-2,2,6,6-tetra(methyl-$d_3$)-heptane-3,5-dionato]holmium, m.p. 180°–182° C.

EXAMPLE 12

Similarly, substitution of holmium nitrate for the europium or praseodymium nitrates in Example 5 yields tris[1,1,1,4,4,7,7,7-octadeutero-2,2,6,6-tetra(methyl-$d_3$)-heptane-3,5-dionato]holmium, m.p. 180°–182° C.

EXAMPLE 13

By replacing the europium nitrate employed in Example 1 by an equivalent quantity of ytterbium nitrate and following the procedure of Example 1 there is prepared tris-[1,1,1-trideutero-2,2-di(methyl-$d_3$)-6,6,7,7,8,8,8-heptafluorooctane-3,5-dionato]ytterbium, m.p. 125°–130° C.

EXAMPLE 14

Replacement of europium nitrate and the diketone employed in Example 1 by an equivalent amount of ytterbium nitrate and 1,1,1,7,7,7-hexadeutero-2,2,6,6-tetra(methyl-$d_3$)-heptane-3,5-dione, respectively, and following the procedure of Example 1 there is obtained tris[1,1,1,7,7,7-hexadeutero-2,2,6,6-tetra(methyl-$d_3$)-heptane-3,5-dionato]ytterbium, m.p. 167°–170° C.

EXAMPLE 15

Similarly, substitution of ytterbium nitrate for the europium or praseodymium nitrates in Example 5 yields tris[1,1,1,4,4,7,7,7-octadeutero-2,2,6,6-tetra(methyl-$d_3$)-heptane-3,5-dionato]ytterbium, m.p. 167°–170° C.

EXAMPLE 16

Replacement of the 1,1,1,7,7,7-hexadeutero-2,2,6,6-tetra(methyl-$d_3$)-heptane-3,5-dione employed in Example 1 by an equivalent quantity of 3-(*tert*-butylcarbonyl)-camphorate-$d_{24}$ and following substantially the same procedure described in Example 1 there is obtained tris[3-(tert-butylhydroxy-methylene)- camphorato-$d_{24}$]europium.

EXAMPLE 17

By replacing the diketone employed in Example 1 by an equivalent quantity of heptafluoropropylcarbonyl-camphor-$d_{15}$ and following substantially the same procedure described in Example 1 there is obtained tris[3-(1,1,1,2,2,3,3-hexafluoropropylhydroxymethylene)-camphorato-$d_{15}$]praseodymium.

EXAMPLE 18

By following substantially the same procedure described in Example 1 but employing equivalent quantities of holmium nitrate and 1,1,1-trideutero-2,2-di(methyl-$d_3$)-5-(1-adamantyl-$d_{15}$)-pentane-3,5-dione in place of the europium nitrate and diketone employed in Example 1, there is obtained tris[1,1,1-trideutero-2,2-di(methyl-$d_3$)-5-(1-adamantyl-$d_{15}$)-pentane-3,5-dionato]holmium.

EXAMPLE 19

By replacing the diketone employed in Example 1 by an equivalent quantity of 1,1,1,2,2,3,3-heptafluoro-6-(1-adamantyl-$d_{15}$)-hexane-4,6-dione and following substantially the same procedure described in Example 1 there is obtained tris[1,1,1,2,2,3,3-heptafluoro-6-(1-adamantyl-$d_{15}$)-hexane-4,6-dionato]europium.

By replacing the diketone of Example 1 by equivalent quantities of

(20) 1-bromo-5,5-di(methyl-d₃)-3,3,6,6,6-pentadeuterohexane-2,4-dione,

(21) 1-chloro-6,6-di(methyl-d₃)-4,4,7,7,7-pentadeuteroheptane-3,5-dione,

(22) 1,1-dichloro-5,5-di(methyl-d₃)-3,3,6,6,6-pentadeuteroheptane-3,4-dione,

(23) 1,2-dibromo-6,6-di(methyl-d₃)-4,4,7,7,7-pentadeuteroheptane-3,5-dione,

(24) 1,2-pentafluoro-6,6-di(methyl-d₃)-4,4,7,7,7-pentadeuteroheptane-3,5-dione,

(25) 1-chloro-5,5-di(methyl-d₃)-3,3,6,6,6-pentadeuterohexane-2,4-dione,

(26) 1,1,1-trideutero-2,2-di(methyl-d₃)-5-(2-furyl)-pentane-3,5-dione, and

(27) 1,3-di(1-adamantyl-d₁₅)-propane-1,3-dione and following the same procedure employing, separately, europium nitrate and praseodymium nitrate there is obtained, respectively,

EXAMPLE 20 tris[1-bromo-5,5-di(methyl-d₃)-3,3,6,6,6-pentadeuterohexane-2,4-dionato]europium and praseodymium

EXAMPLE 21 tris[1-chloro-6,6-di(methyl-d₃)-4,4,7,7,7-pentadeuteroheptane-3,5-dionato]europium and praseodymium

EXAMPLE 22 tris[1,1-dichloro-5,5-di(methyl-d₃)-3,3,6,6,6-pentadeuterohexane-2,4-dionato]europium and praseodymium

EXAMPLE 23 tris[1,2-dibromo-6,6-di(methyl-d₃)-4,4,7,7,7-pentadeuteroheptane-3,5-dionato]europium and praseodymium

EXAMPLE 24 tris[1,2-pentafluoro-6,6-di(methyl-d₃)-4,4,7,7,7-pentadeuteroheptane-3,5-dionato]europium and praseodymium

EXAMPLE 25 tris[1-chloro-5,5-di(methyl-d₃)-3,3,6,6,6-pentadeuterohexane-2,4-dionato]europium and praseodymium

EXAMPLE 26 tris[1,1,1-trideutero-2,2-di(methyl-d₃)-5-(2-furyl)-pentane-3,5-dionato]europium and praseodymium

EXAMPLE 27 tris[1,3-di(1-adamantyl-d₁₅)-propane-1,3-dionato]europium and praseodymium

Tris chelates of all of the diketones 20–27 can be prepared by reaction of each of them according to the process of Example 1 with samarium, terbium, holmium and ytterbium.

We claim:

1. A trans-parent-to-proton NMR shift reagent tris chelate having the structure

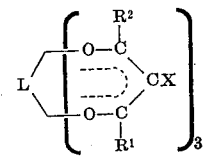

wherein L is europium, praseodymium, samarium, terbium, holmium or ytterbium; X is hydrogen or deuterium; $R^1$ is $C_{1-10}$ alkyl or $C_{6-10}$ polycycloalkyl; $R^2$ is $C_{1-10}$ alkyl or $C_{6-10}$ polycycloalkyl, thienyl or furyl; X and $R^2$ in the moiety

can be linked to form, with the carbon atoms to which they are attached the 3-camphoryl-d₁₅ radical, and either or both of $R^1$ and $R^2$ is deuterium substituted and when only one of $R^1$ and $R^2$ is deuterium substituted the other contains hydrogen or is completely or partially halogenated with chlorine, bromine and/or fluorine and in each instance to a degree that the resulting diketone moiety of the chelate contains from zero to no more than five hydrogen atoms.

2. A tris chelate as claimed in claim 1 wherein L is europium or praseodymium.

3. A tris chelate as claimed in claim 1 wherein L is europium or praseodymium and X is hydrogen.

4. A tris chelate as claimed in claim 1 wherein L is europium or praseodymium and X is deuterium.

5. A tris chelate as claimed in claim 1 wherein L is europium or praseodymium and $R^1$ is t-butyl-d₉.

6. A tris chelate as claimed in claim 11 wherein L is europium or praseodymium, $R^1$ is t-butyl-d₉ and $R^2$ is deuterated $C_{1-10}$ alkyl.

7. A tris chelate as claimed in claim 6, wherein $R^2$ is t-butyl-d₉.

8. A tris chelate as claimed in claim 1, wherein L is europium or praseodymium, $R^1$ is t-butyl-d₉ and $R^2$ is fluorinated $C_{1-10}$ alkyl.

9. A tris chelate as claimed in claim 8 wherein $R^2$ is heptafluoropropyl.

10. A tris chelate as claimed in claim 1 wherein L is europium or praseodymium, $R^1$ is t-butyl-d₉ and $R^2$ is 2-thienyl.

* * * * *